H. H. HEATHERINGTON & C. O. LONG.
EGG SEPARATOR.
APPLICATION FILED MAR. 9, 1909.
941,415.
Patented Nov. 30, 1909.
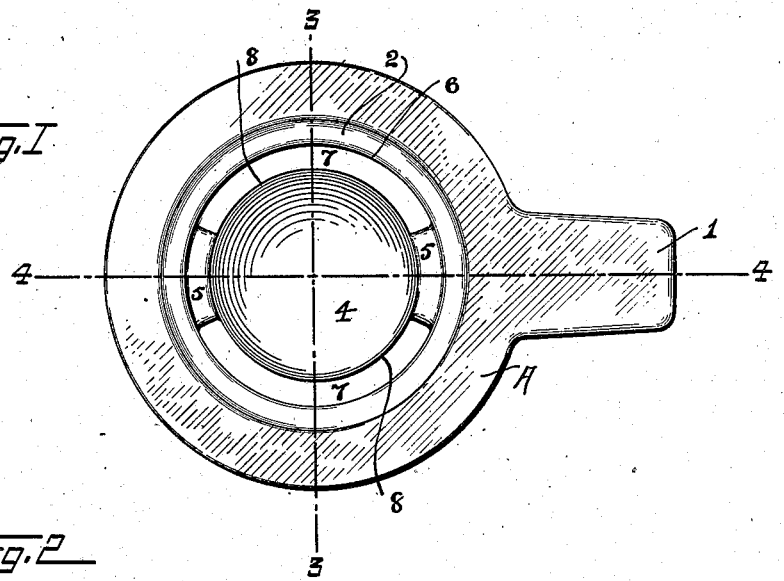
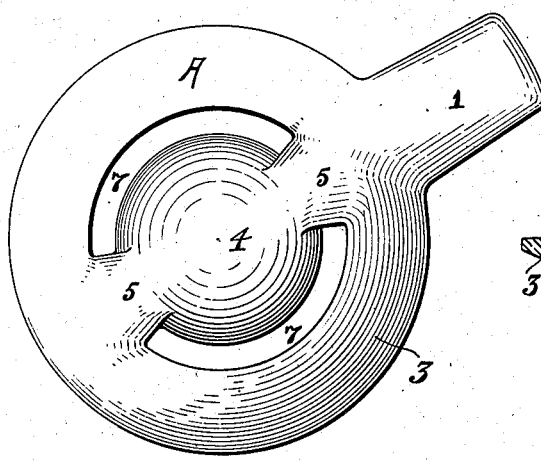
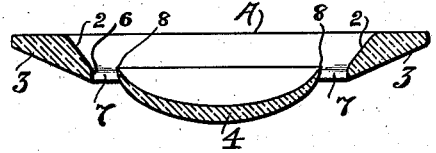
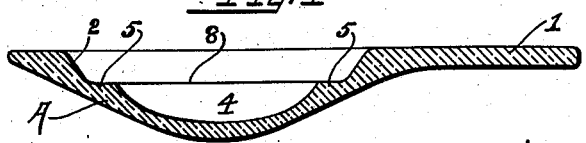
WITNESSES:
INVENTORS
Howard H. Heatherington
Corwin O. Long.
By N. E. Dunlap
ATTORNEY.

UNITED STATES PATENT OFFICE.

HOWARD H. HEATHERINGTON AND CORWIN O. LONG, OF BELLAIRE, OHIO.

EGG-SEPARATOR.

941,415.  Specification of Letters Patent.  Patented Nov. 30, 1909.

Application filed March 9, 1909. Serial No. 482,233.

*To all whom it may concern:*

Be it known that we, HOWARD H. HEATHERINGTON and CORWIN O. LONG, citizens of the United States of America, and residents of Bellaire, county of Belmont, and State of Ohio, have invented certain new and useful Improvements in Egg-Separators, of which the following is a specification.

This invention relates to egg separators, and pertains especially to that type adapted for seating upon the top of a glass or goblet.

The object of the present invention is to provide an egg separator especially adapted for household use wherein the whites and yolks of the eggs may be readily and easily separated.

A further object of the invention is to so construct the separator of glass, or any other suitable material, that it will be inexpensive in manufacture, mechanically strong, and of a nature that will enable it to be easily and quickly cleansed.

With these and other objects in view the invention consists in certain novel features of construction and combinations of parts as will be more readily understood by reference to the following drawings, in which:—

Figure 1, is a top plan view of the device. Fig. 2, is a view of the under side. Fig. 3, is a section on the line 3—3 of Fig. 1. Fig. 4, is a section on the line 4—4 of Fig. 1.

In the form of the invention as now contemplated the body portion A, of the egg separator consists of a substantially annular member formed with an integral handle 1 which projects outwardly therefrom. The inner side of the body A, is formed tapering as at 2, converging downwardly toward the center as clearly seen in Fig. 3, of the drawings. The other side of the body portion A of the device is also tapered as shown at 3 which adapts the same to be more readily and securely supported upon a vessel into which it is desired to place the white of an egg.

A shallow annular cup 4, of a diameter slightly smaller than the inner circumference 6, of the body portion A is formed in the center of and in spaced relation to the said body portion during the process of manufacture, cup 4, being supported by means of a pair of diametrically opposite arms 5, 5.

The space between the periphery of the cup 4, and the converging inner walls of the body A provides a pair of opposite passages for the separated whites of an egg to pass downwardly through.

Referring more particularly to Fig. 3, and to the cup 4, therein depicted it will be noted that the pair of semi-circular edges 8, 8, of the said cup are very sharp so that during the process of separation the white is cut clean and entirely loose from the yolk.

In using the egg separator, the body portion A is placed upon a vessel into which the white of an egg is desired to be placed, thus disposing the cup portion centrally over the vessel. The shell of the egg is first broken in any desired manner then, the entire contents of the shell is dropped bodily upon the cup 4, at which time the white of the egg comes into contact with the sharp edges 8, 8, of the said cup and is promptly separated thereby from the yolk. The yolk settles within the cup 4, and causes the white to flow over the edges 8, 8, and downwardly through the passage or openings 7, into the vessel below.

The article, it will be noted is of extremely simple construction, and can be made with comparative inexpense in a single piece of glass. Due to the inclination of the bottom face 3, of the body, it will be observed that the body will be accommodated to vessels of varying diameters while still maintaining the security and firmness of the seating thereof on the vessel. Further it will be noted that the arms or connecting portions 5, are in alinement with the handle, whereby the article may be conveniently formed in the mold, the molten glass being poured in the top of the mold and allowed to gravitate to position, the handle having an upright position.

Having thus described the invention what is claimed is:—

An egg separator comprising an annular body having an inclined lower face and an inclined upper face, said faces converging toward the center of said body, a cup having a sharpened upper edge spaced from and located on the interior of said body so that said edge lies approximately flush with the lower end of the upper inclined face of said body, and a pair of arms secured to said cup and body and extending across the space therebetween.

In testimony whereof we affix our signatures in presence of two witnesses.

HOWARD H. HEATHERINGTON.
CORWIN O. LONG.

Witnesses:
H. E. DUNLAP,
BRUCE MORRIS.